United States Patent Office
3,229,970
Patented Jan. 18, 1966

3,229,970
METALLURGICAL FURNACE LINING
George R. Henry, Bethel Park, Pa., assignor to Harbison-Walker Refractories Company, Pittsburgh, Pa., a corporation of Pennsylvania
No Drawing. Filed Mar. 2, 1964, Ser. No. 348,829
The portion of the term of the patent subsequent to Aug. 17, 1982, has been disclaimed
7 Claims. (Cl. 266—43)

The present invention relates to a metallurgical furnace and a monolithic refractory lining therefor.

Various types of refractory materials are used in large tonnages for installing complete linings and maintaining existing linings by means of pneumatic emplacement and the like. Basic refractory gunning mixes are supplied for maintaining open hearth and electric furnace walls and roofs and like environments coming in contact with chemically basic fumes and slags. Fire clay and high alumina gunning mixes are used in the maintenance and in the walls and arches in slag heating furnaces, soaking pits, and similar environments in which neutral or acid refractories are required. This invention relates particularly to the class "basic" refractories.

There are two types, generally, of basic gunning refractories as far as methods of installation are concerned. The first is a finely divided air-setting refractory. It may be applied to cold surfaces but is particularly useful where installation temperatures are high. As noted, this material is finely divided and, normally, is blended with water to form a slurry in a mixer for application with a "wet gun." The second type uses a coarser size graded mix, wherein, normally, water is mixed with the refractory material at the gunning apparatus nozzle. This is a "dry gun" application. The latter method is particularly applicable to the present invention.

An object of the present invention is to provide a monolithic refractory lining capable of being fabricated in situ between furnace heats and while the furnace is maintained at an elevated temperature.

Another object of the invention is to provide a monolithic basic refractory lining formed on its situs of use by gunning techniques.

Other objects of the invention will appear hereinafter.

In accordance with the present invention, basic refractory granular particles, containing on the burned basis a total of at least 90%, by weight, of MgO, SiO₂ and CaO and in which the weight ratio of CaO to SiO₂ is in excess of that required to form dicalcium silicate, are mixed with nonrefractory material consisting of a total of at least 85%, by weight, of SiO₂ and CaO (in about a 1 to 1 ratio) and a fibrous asbestos consisting predominantly of MgO and SiO₂. The constituents are mixed in such proportions that the overall weight ratio of CaO to SiO₂ is about 1.87 to 1.

The mixture is forcefully impacted, preferably with a dry gun, on a surface within the furnace requiring a refractory material. It is important, that the surface to which the refractory be applied is maintained at a temperature higher than that of incipient fusion of the non-refractory material. While this appears to be a detriment, it is actually a benefit since the refractory lining may be fabricated while a furnace is in operation, between furnace heats. As the less refractory material melts, the liquid formed reacts with the lime of the refractory constituent and the asbestos to form dicalcium silicate which fuses only at much higher temperatures. As heating is continued, all of the less refractory components are eliminated by reaction with the refractory granular material and asbestos to bond all the granules together in a load bearing product whch softens only at very high temperature.

The basic refractory granules may be selected from suitably size graded materials or mixtures of the group dead burned dolomite, dead burned dolomitic magnesite and dead burned magnesite. Hard burned lime and/or pure silica may be added, if necessary, to obtain the desired CaO to SiO₂ ratio. It is important that the CaO to SiO₂ ratio in the basic refractory material is in excess of that required to form dicalcium silicate. If the ratio is initially 1.87 to 1 or roughly 2 to 1, dicalcium silicate will form within the basic refractory grain itself upon heating without providing the necessary bond between grains. However, when the CaO is in excess, it will react with the SiO₂ in the non or less refractory material and asbestos to form dicalcium silicate on the surface of the basic grains and thus bond all of them together. The actual ratio of CaO to SiO₂ required in the basic material will be dependent upon the proportion of each ingredient in the batch. However, for the preferred proportion set forth, this ratio should range between 2.5 and 3 to 1. The baisc refractory material preferably constitues from about 70 to 90%, by weight of the batch.

The nonrefractory material may be natural or preformed and may be selected from any of the known calcium silicates where lime and silica are present in approximately equal proportions. The preferred nonrefractory material is wollastonite or wollastonite slag. The mineral wollastonite has the theoretical formula $$CaO \cdot SiO_2$$

equivalent to about 48.3% CaO and 51.7% SiO₂. This mineral melts incongruently at 2811° F. Wollastonite slag, which is phosphorous furnace slag, contains over 90% of the mineral wollastonite and minor amounts of MgO, Al₂O₃, FeO and P₂O₅. This nonrefractory material is preferably present in the mixture in amounts of from about 10 to 25%, by weight.

The fibrous asbestos in the mixture serves a two-fold purpose. It supplies some of the SiO₂ in the reaction with the basic refractory material and nonrefractory material for the formation of dicalcium silicate. It also serves as a gunning aid.

One of the problems encountered when gunning a refractory material is the high losses due to refractory material bouncing back off a wall upon which it is being emplaced. This loss is term "rebound" in the art. Rebound loss has been as high as 40 and 50%. However, a small amount of asbestos fibers added to the refractory mixture reduced rebound losses to below 5%. It is desirable that the asbestos be maintained between 1 and 5%, by weight of the total mix, since above that amount there is an undesirable decrease in density. Below about 1% it will be only slightly effective as a gunning aid.

Generally, asbestos types are named after their chief mineral constituent. Examples are crysotile, crocidolite, and tremolite, stated as H₄Mg₃Si₂O₉, NaFe(SiO₃)₂FeSiO₃ and CaMg₃(SiO₃)₄. The first is generally referred as Mg—Si asbestos since oxides of these two metals are principal ingredients. This is the type of asbestos preferably used in the invention. The oxides MgO and SiO₂ as present in the present Mg—Si asbestos fibers do not diminish the refractoriness of the mixes of the invention, at least to any appreciable extent.

If desired, up to 1% of bentonite and up to 2% of sodium silicate may be added to the mixture as a gunning and sintering aid respectively. It has been found that the best results are obtained when the mixture is size graded so that about 50%, by weight, is −4+65 mesh and about 50%, by weight, is −65 mesh. It is also desirable that the majority (actually, in the range 40 to 60% by weight of the +65 mesh fraction be coarser than a 35 mesh screen.

The refractory composition of the invention may be employed in combination with gunning techniques to provide permanent wall linings or bottoms in basic open hearth or oxygen furnaces, but is most commonly employed for patching and maintenance of such furnaces and it will adhere even to slag surfaces.

The following example of the present invention is given by way of explanation and not by way of limitation. All parts and percentages are by weight. All chemical analyses are on the basis of an oxide analysis. All sizing is according to the Tyler standard sieve series and, of course, should be considered but typical.

A mixture is prepared of about 30% ball mill fine dead burned magnesite, about 42% of −6 mesh dead burned dolomite, about 23% of ball mill fine wollastonite slag, about 2% of Mg—Si asbestos fibers (shorts), about 1% of clay spur bentonite and about 2% of dry, powdered sodium silicate, having a sodium oxide to silicon dioxide ratio on the order of 1 to 2. The material was spread on a used refractory lining having a slagged surface maintained at a temperature of 2900° F. After 15 minutes, the sinterability of the material was excellent. After cooling of the refractory mixture and lining support to room temperature, it was found that the composition strongly adhered to the slagged surface of the used lining.

Actual service trials were conducted in which the above refractory mixture was gunned on a used lining of a basic oxygen furnace between heats. The lining temperature was about 2900° F. and a dry gun apparatus was employed. The results of these tests were satisfactory.

The exemplary mixture had the following overall chemical analysis: 13.5% $SiO_2$, 32.5% CaO, 46.1% MgO, 2.5% $Al_2O_3$, 4.1% $Fe_2O_3$, and 0.5% ignition loss. The same mixture has the following typical screen analysis: 20%−4+10 mesh, 20%−10+28 mesh, 10%−28+65 mesh, and 50%−65 mesh.

The foregoing explanation and examples are presented only by way of providing those skilled in the art with sufficient detail as to practiced the invention and not by way of limitation; and the true measure of the spirit and scope of the invention is set forth in the following claims.

I claim:

1. In a metallurgical furnace, a monolithic refractory lining capable of being provided in situ between furnace heats and while said furnace is maintained at an elevated temperature, by gunning techniques, said lining being formed from a batch mixture consisting essentially of: (a) basic refractory granular particles containing on the burned basis, a total of at least 90%, by weight, of MgO, $SiO_2$ and CaO and in which the weight ratio of CaO to $SiO_2$ is in excess of that required to form dicalcium silicate, (b) nonrefractory material consisting of a total of at least 85%, by weight, of $SiO_2$ and CaO and in which the weight ratio of CaO to $SiO_2$ is about 1 to 1, and (c) fibrous asbestos consisting predominantly of MgO and $SiO_2$, said batch being combined in such proportions that the weight ratio of CaO to $SiO_2$ in the overall mixture is about 2 to 1, the situs of use of said lining being maintained at a temperature higher than that of incipient fusion of the nonrefractory material wherein ingredients in the batch can react to form dicalcium silicate and bind the basic refractory granular particles together.

2. In a metallurgical furnace, a monolithic refractory lining capable of being formed in situ between furnace heats and while said furnace is maintained at an elevated temperature, by gunning techniques, said lining being formed from a batch mixture consisting of three unreacted constituents, a first constituting from about 70 to 90%, by weight, of the batch and consisting of highly refractory basic particles composed essentially of MgO, CaO and $SiO_2$ and selected from the group consisting of dead burned dolomite, dead burned dolomite magnesite, and dead burned magnesite, a second ingredient constituting from about 10 to 25%, by weight, of the mixture and consisting of a nonrefractory material composed essentially of $SiO_2$ and CaO, and a third ingredient constituting from 1 to 5%, by weight, of the batch and composed of a fibrous asbestos consisting predominantly of MgO and $SiO_2$, the quantity of CaO in the batch mixture being at least sufficient to form dicalcium silicate with all the silica therein to provide a refractory binder matrix for the basic particles.

3. A monolithic basic refractory lining formed on its situs of use by gunning techniques with a minimum of rebound, said refractory lining being formed from the reaction products of a batch mixture consisting essentially of: (a) basic refractory granular particles containing on the burned basis, a total of at least 90%, by weight, of MgO, $SiO_2$ and CaO and in which the weight ratio of CaO to $SiO_2$ is in excess of that required to form dicalcium silicate, (b) nonrefractory material consisting of a total of at least 85%, by weight, of $SiO_2$ and CaO and in which the weight ratio of CaO to $SiO_2$ is about 1 to 1, and (c) fibrous asbestos consisting predominantly of MgO and $SiO_2$, said batch being combined in such proportions that the weight ratio of CaO to $SiO_2$ in the overall mixture is about 2 to 1, the situs of use of said lining being maintained at a temperature higher than that of incipient fusion of the nonrefractory material whereon ingredients of the batch react to form dicalcium silicate which binds the basic refractory granular particles together.

4. The lining of claim 3 in which the nonrefractory material in the batch is wollastonite.

5. The lining of claim 3 in which the fibrous asbestos is crysotile.

6. In a metallurgical furnace, a monolithic refractory lining capable of being provided in situ between furnace heats and while said furnace is maintained at an elevated temperature, by gunning techniques, said lining being formed from a batch mixture consisting essentially of: basic refractory granular particles containing on the burned basis a total of at least 90%, by weight, of MgO, $SiO_2$ and CaO and in which the weight ratio of CaO to $SiO_2$ is in excess of that required to form dicalcium silicate; nonrefractory material consisting of a total of at least 85%, by weight, of $SiO_2$ and CaO and in which the weight ratio of CaO to $SiO_2$ is about 1:1, fibrous asbestos consisting predominantly of MgO and $SiO_2$, and a minor amount of clay and sodium silicate, said batch being combined in such proportions that the weight ratio of CaO to $SiO_2$ in the overall mixture is about 2:1, the situs of use of said lining being maintained at a temperature higher than that of incipient fusion of the nonrefractory material wherein ingredients in the batch can react to form dicalcium silicate and bind the basic refractory granular particles together.

7. The lining of claim 6 in which the clay and sodium silicate are present in amounts of 1% and 2% respectively, based upon the total weight of the batch.

References Cited by the Examiner

UNITED STATES PATENTS

| | | | |
|---|---|---|---|
| 2,647,062 | 7/1953 | Lathe | 106—58 |
| 3,047,411 | 7/1962 | Chantler et al. | 106—58 XR |
| 3,047,711 | 7/1962 | Chantler et al. | 106—58 XR |
| 3,092,505 | 6/1963 | Demaison | 106—99 XR |
| 3,093,497 | 6/1963 | Demaison | 106—59 |
| 3,141,790 | 7/1964 | Davies et al. | 106—58 XR |

FOREIGN PATENTS

| | | |
|---|---|---|
| 153,177 | 12/1950 | Australia. |
| 538,164 | 3/1957 | Canada. |

ROBERT F. WHITE, *Primary Examiner.*

J. A. FINLAYSON, *Assistant Examiner.*